Jan. 4, 1938. N. M. BAKER 2,104,503
METHOD OF FORMING CONNECTING MEANS FOR OPHTHALMIC MOUNTINGS
Original Filed Aug. 15, 1933 2 Sheets-Sheet 1
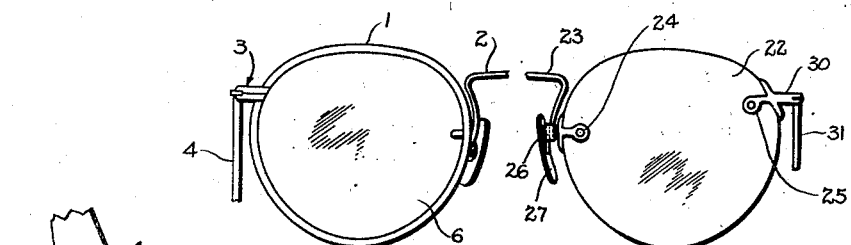
FIG. I.  FIG. II.
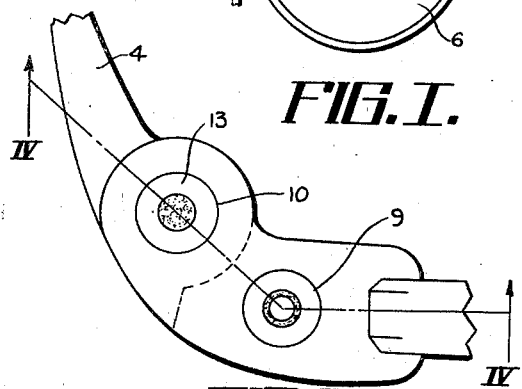
FIG. III.
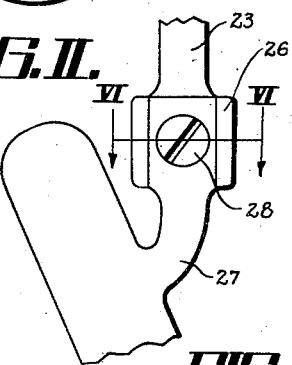
FIG. V.
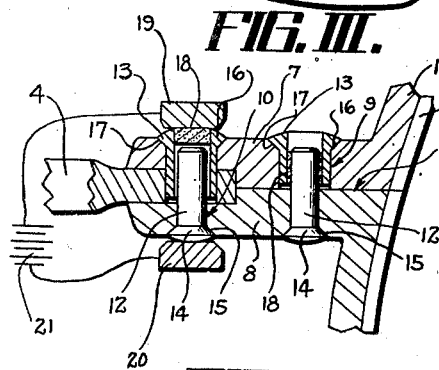
FIG. IV.
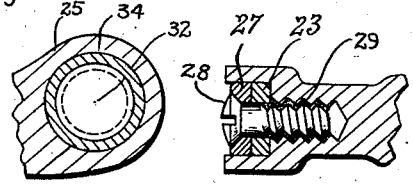
FIG. VIII.  FIG. VI.
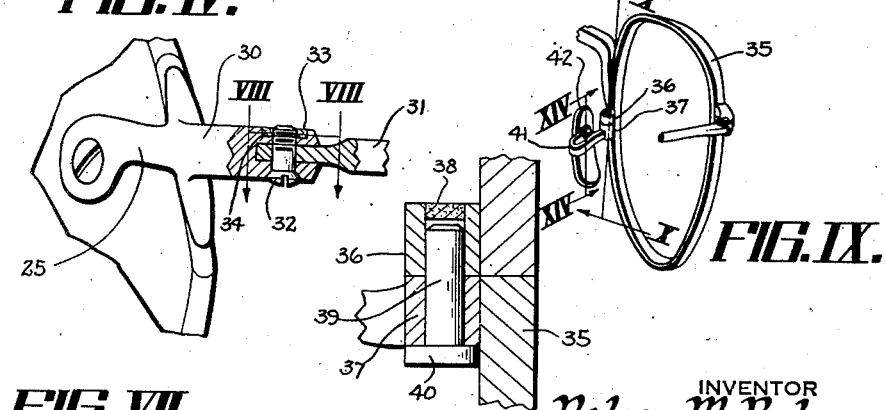
FIG. VII.  FIG. X.  FIG. IX.
INVENTOR
Nelson M. Baker.
BY
Harry H. Styll
ATTORNEY Jan. 4, 1938.   N. M. BAKER   2,104,503
METHOD OF FORMING CONNECTING MEANS FOR OPHTHALMIC MOUNTINGS
Original Filed Aug. 15, 1933    2 Sheets-Sheet 2
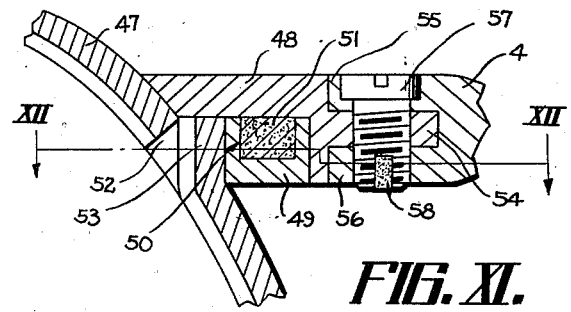
FIG. XI.
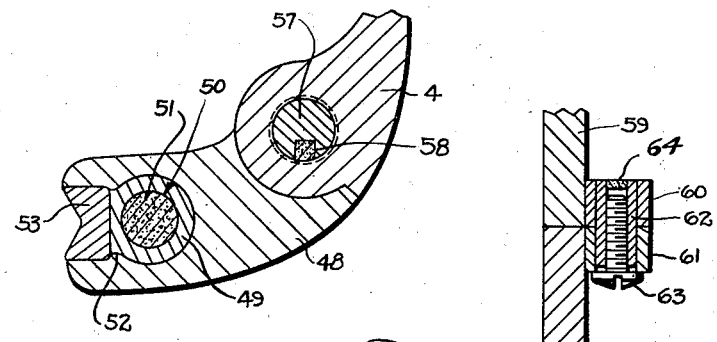
FIG. XII.    FIG. XIII.
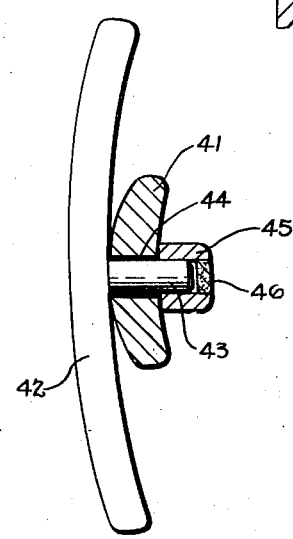
FIG. XIV.
INVENTOR
Nelson M. Baker.
BY
Harry H. Styll
ATTORNEY Patented Jan. 4, 1938

2,104,503

UNITED STATES PATENT OFFICE 2,104,503

METHOD OF FORMING CONNECTING MEANS FOR OPHTHALMIC MOUNTINGS

Nelson M. Baker, Southbridge, Mass., assignor to American Optical Company, Southbridge, Mass., a voluntary association of Massachusetts Application August 15, 1933, Serial No. 685,198
Renewed May 26, 1937

10 Claims. (Cl. 29—20)

This invention relates to improvements in ophthalmic mountings and more particularly to integrally securing together the parts thereof that have hitherto been separably united by threaded holding connections and to an improved process for accomplishing the same.

One of the principal objects of the invention is to provide new and improved connecting or securing means for the separable or operable parts of an ophthalmic mounting and method of making and mounting the same so as to insure a positive and integral connection which requires only a minimum amount of time and labor to be completed and ready for use.

Another important object of the invention is to provide improved connecting or securing means of the above character which may be integrally united and having means incorporated therein for compensating for variation in the thickness of the parts being united and to provide better and much more inexpensive methods of assembling and uniting the parts wherein less experienced and less expensive operators may be quickly trained to perform the necessary operation.

Another important object of the invention is to provide a method and means of connecting the parts of an ophthalmic mounting in which the securing means necessary to connect the parts may be produced and prepared in the factory and ready for use without the need of any additional material.

Another object is to provide connecting means incorporating a suitable metallic cement such as solder or other metallic alloy which will withstand boiling water or other tests and an improved method of forming the parts and of providing them with the solder or other suitable metallic cement means.

Other objects and advantages of the invention will become apparent from the following description taken in connection with the accompanying drawings, and it will be apparent that many changes in the arrangement of parts, details of construction, and in the steps of the process may be made without departing from the spirit of the invention as expressed in the accompanying claims. I, therefore, do not wish to be limited to the exact details shown and described, as the preferred forms and operations only have been shown by way of illustration.

Referring to the drawings:

Fig. I is a partial front elevation of a frame type ophthalmic mounting embodying the invention;

Fig. II is a partial front elevation of a rimless type mounting embodying the invention;

Fig. III is an enlarged fragmentary plan view of one of the connections embodying the invention;

Fig. IV is a sectional view taken on line IV—IV of Fig. III;

Fig. V is an enlarged fragmentary side view of the stud box connection shown in Fig. II;

Fig. VI is a sectional view taken on line VI—VI of Fig. V.

Fig. VII is a perspective view partially shown in section showing the temple connecting means of Fig. II and which embodies one form of the invention;

Fig. VIII is an enlarged fragmentary sectional view taken on line VIII—VIII of Fig. VII;

Fig. IX is a perspective view of a portion of a frame type mounting showing another embodiment of the invention;

Fig. X is an enlarged fragmentary sectional view taken on line X—X of Fig. IX;

Fig. XI is a view similar to Fig. IV showing another modified form of the invention;

Fig. XII is a sectional view taken on line XII—XII of Fig. XI;

Fig. XIII is a view similar to Fig. X showing another modified form of the invention;

Fig. XIV is an enlarged sectional view taken on line XIV—XIV of Fig. IX.

In the prior art it has been usual to make certain connections of an ophthalmic mounting separable for fitting. These various separable or operable connections such as the lens rims to lenses, endpieces, temple connections, stud boxes, guards, etc. were in most instances in the past secured together by means of screws passing through aligned openings in the parts to be connected. One of the difficulties encountered in mountings of the above nature is that of having the screw back out and the connections become loose and wabbly during the use of the mounting or of having the thread connections thereof become worn or break away. This not only caused the lenses to become loose and move off axis in the lens rims, but also allowed the temples to loosen and sag and improperly support the lenses before the eyes. These defects, in instances wherein cylindrical or prismatic lenses were being worn, proved quite troublesome and in many instances injurious to the wearer. The various connections required constant attention and tightening and in instances when the thread connections became worn or broken the mounting had to be replaced with a great expense to the wearer.

The work of assembling the parts of the various connections had to be done with such nicety that only experienced operators could perform the work satisfactorily as the parts had to be aligned and fitted with exceeding exactness.

Applicant overcomes the above defects by integrally uniting the parts by a solder or the like which is quick setting and by which the connections can be quickly and easily formed and which will be more or less permanent during use. Applicant also provides positive and novel means for controlling and handling the amount of solder or the like used and with his improved arrangement can assemble and unite the parts, ready for use, in a few seconds. The work can be performed by more or less inexperienced operators and is a very marked advance over prior art connections which require much time and skill and which in most instances had to be performed by trained, experienced and expensive operators.

Applicant's device is exceedingly simple in construction and forms connections which during use are of a more positive and permanent nature.

Referring to the drawings wherein similar reference characters designate corresponding parts throughout, in Fig. I the invention is shown applied to an ophthalmic mounting comprising a pair of split lens rims 1 connected by a bridge member 2 and provided adjacent the split ends with connecting means 3 by means of which the split ends of the rim may be secured together and which also form an attachment for the temples 4. The rims 1 are each provided with a lens groove 5, see Fig. IV, to hold the lens 6 in place therein and are provided on one end of the split connections as shown in Figures III and IV, with a projection 7 and on the opposite end with a similar projection 8. The projections 7 and 8 are provided with aligned openings 9 and 10 and with abutting surfaces 11. The aligned openings 9 provide means for receiving the connecting means for securing the split ends of the rims together and the aligned openings 10 provide means for receiving the connecting means for the temple 4. The connecting means as shown in Fig. IV comprises a headed pin 12 and a headed tube or caplike member 13. The enlarged head of the pin 12 is provided with a beveled edge 14 which is adapted to engage with the beveled side walls 15 of the opening.

The tube or caplike member 13 in each instance is provided at its end having the enlarged head with a beveled peripheral edge 16 adapted to engage with the beveled side walls 17 of the openings. The tube or caplike members 13 at their enlarged ends are provided with a disc or wad of solder or like means 18. The disc or wad 18 is pressed within the bore of the member 13 and is compressed while in said bore to cause it to frictionally engage with the side walls of the bore and remain in fixed relation therewith. This disc or wad of solder 18 is placed internally of the tube or cap 13 during the manufacture thereof and is carried by said tube or cap until the parts are assembled and ready for use.

The pin 12 and tube or caplike member 13 are adapted to be placed in telescoped relation with each other in the aligned openings 9 and 10 and are held therein by a clamp or other suitable means. The assembled parts are then subjected to heat to cause the solder to melt and flow between the pin and tube or caplike members 12 and 13 and are then allowed to cool to allow the solder to harden and integrally unite said members. It will be understood that prior to the assembling of the parts the pin and tube or caplike member may be treated with a suitable flux to aid the adhering action of the solder. In Fig. IV the temple connecting tube or caplike member 13 is shown with the solder disc or wad 18 frictionally held therein prior to the heating and melting thereof and the adjacent tube or caplike member 13 for the split rim connection is shown with the solder disc melted and integrally uniting the parts. The parts may be heated by any suitable means such as a pair of heating units 19 and 20 attached to a source of electrical energy 21.

Attention is directed to the fact that the parts are held in proper assembled relation with each other during the heating and are held in said relation until the parts are allowed to cool and unite with each other. In this manner the parts are integrally connected and more or less permanently maintain their fitted relation with each other during use. When it is desired to separate the parts the connection is heated by any suitable means and a suitable tool having a projection thereon is inserted in the open end of the tube or caplike member and the pin is pushed out. This disunites the pin and tube and allows them to be removed so that the parts may be separated. This, of course, can only be done when the parts are heated to such a degree as to soften the solder.

In Fig. II the invention is shown applied to a rimless type ophthalmic mounting comprising a pair of lenses 22 connected by a bridge member 23 and having lens connections 24 and 25 on the nasal and temporal sides thereof. The lens connection 24 is provided with a stud box 26 Fig. V adapted to receive the end of the bridge 23 and the support arm for the nose guard 27. The bridge 23 and nose guard 27, as shown in Figs. V and VI, are secured within the stud box 26 by means of a connecting screw 28 having a coating of solder or like means 29 thereon which after the parts are tightened in position by the screw member 28 the connection may be subjected to heat to soften the solder 29 to cause it to run between the parts and when cooled to adhere thereto and integrally unite the same. This type of connection provides means whereby the parts may be drawn into tight relation with each other by the connecting screw 28 and also provides means whereby the screw may be locked against backing out and becoming loose during use. It will be understood that if desired the parts may be treated by a suitable flux for increasing the adhering action of the solder or like means. When it is desired to separate the parts the said parts are subjected to heat to soften the solder and the screw is backed out.

The lens connection 25 as shown in Figs. II and VII is provided with a temple support 30 for the temple 31. The temple 31 is connected to the temple support 30 by means of a screw 32 which passes through aligned openings in the support and temple. The support 30 is provided as shown in Figs. VII and VIII with a ring of solder 33 frictionally held in a counterbore 34 in said support. When the screw 32 is tightened in position it extends through the solder ring 33, and when in proper relation with each other the parts are subjected to heat to cause the solder ring to melt and when cool to adhere to the screw and support and integrally unite the same. This prevents the screw from backing out and becoming loose during use. It will be understood that the parts may be treated with a suitable flux prior to being united. Attention is also directed to the fact that the solder ring 33 is placed in one of the exposed faces of the support 30 and acts as a lock washer when the parts are in united relation with each other and does not in any way hinder the pivotal movement of the temple 31 in the support 30.

In Figs. IX and X there is shown a modified form of the invention wherein the divided lens rim 35 is provided with aligned tubular lugs 36 and 37 the diameter of which is substantially the width of the rim and preferably connected to the rear of said rim so as to be substantially invisible when on the face. The said tubular lugs are attached to the rim by a hard solder process or the like which requires a very high temperature. One of the tubular lugs, preferably the upper lug 36, is provided with a disc or wad of solder 38 which is pressed into frictional engagement with the inner walls of the bore of the tube after the said tube has been secured to the rim by the hard soldering process. The solder 38 is preferably of the soft solder type which requires only a low temperature to cause it to melt and flow. A pin member 39 having an enlarged head portion thereon is placed within the bore of the tubular members to hold the rims in aligned relation with each other and is adapted to be held in the tubular members 36 and 37 by subjecting them to heat when the parts are in assembled relation with each other to cause the solder disc or wad 38 to melt and flow between the pin 39 and the internal walls of the tube. The parts are then allowed to cool to cause the solder to adhere to the parts and integrally unite the same. The temperature required to cause the disc or wad 38 to melt and flow is much lower than the temperature required to secure the tubular members 36 and 37 to the rim 35 and, therefore, does not have any effect upon the hard solder which unites the rim and tube. If desired, the tubular members 36 and 37 and the pin member 39 can be treated with a suitable flux to increase the adhering action of the solder 38 prior to being assembled. The tubular members 36 and 37 and the pin member 39 may be formed square in cross sections so as to prevent the split ends of the rim 35 from twisting sidewise during use.

The mounting shown in Fig. IX is provided with a rearwardly extending guard arm 41 to which the nose guard 42 is pivotally attached. The nose guard 42 as shown in Fig. XIV has an outwardly projecting lug 43 which extends through an opening 44 in the end of the guard arm 41. A tubular member or cap 45 fits over the protruding end of the lug 43 and is provided with a disc or wad of solder or like means 46 frictionally held within the bore of the tubular member or cap 45. When the parts are in proper assembled relation with each other, they are subjected to heat to cause the disc or solder wad 46 to melt and flow between the lug 43 and the internal walls of the tubular member or cap 45 and the parts are then allowed to cool to cause the solder to integrally unite the tube and lug. It will be understood that the said tubular member or cap 45 and lug 43 may be provided with a suitable flux to increase the adhering action of the solder prior to being assembled.

In Figs. XI and XII there is shown another modification wherein the divided rim 47 is provided on one end with a housing 48 and on the opposite end with a lug 49 having a counterbore or recess 50 therein filled with soft solder or like means 51. The housing 48 is provided with a recess 52 adapted to receive the end 53 having the lug 49 attached thereto and to receive the said lug 49. The side walls of the recess 52 are adapted to conceal the end 53 and lug 49 from view when the parts are united. The end 53 having the lug 49 attached thereto is deflected outwardly of the general contour shape of the rim 47 to align said end and lug with the opening 52 so that the parts may be drawn together in a direction substantially along a straight line.

When the lens has been properly fitted within the rim 47 the lug 49 and end 53 of the rim are drawn within the housing and clamped by suitable means to hold them in aligned relation with each other and are then subjected to heat to cause the solder means 41 to melt and flow between the united parts. The parts are then allowed to cool to permit the solder 51 to harden and integrally unite the said parts. It will be apparent also that the parts may be treated with a suitable flux to increase the adhering action of the solder if desired.

The housing 48 and lug 49 are secured to the rim 47 by a hard solder process during the manufacture of the mounting and for this reason the heat required to melt the solder 51 does not affect the hard solder connection. The solder means 51 is preferably pressed into the counterbore 50 so that it will be permanently fixed in the counterbore ready for use by the dispenser of the mounting or by the person mounting the prescription lenses therein.

The housing 48 is provided with a wing portion 54 which forms a hinge connection for the temple 4. The temple 4 in this instance is provided with a pair of spaced winglike members 55 and 56 which are provided with aligned openings adapted to be placed in alignment with an opening in the wing 54. One of the wings 55 or 56 is provided with a threaded bore adapted to receive a connecting screw 57. The screw 57 is provided with a slotted recess adjacent its end in which a piece of solder material 58 of the soft solder type is frictionally held. When the temple 4 is properly connected to the housing 48 by the connecting screw 57 heat is applied to the screw to melt the solder 58 after which the connection is allowed to cool and permit the solder to harden and integrally unite the temple wing with the end of the screw. This provides means for preventing the screw backing out and becoming loose during use. The temple connection and rim connection may be simultaneously subjected to the heat treatment to cause the solder means to melt and flow between the parts and likewise may be allowed to cool to permit the solder to harden and integrally unite said parts.

In Fig. XIII there is shown a modified form of split rim connection of the type shown in Fig. X. In this instance the divided lens rim is provided with aligned tubular lugs 60 and 61 which are secured to the rim 59 by a hard solder process. The tubular lugs 60 and 61 are preferably formed from a single tubular member which is attached to the rim 59 by a hard solder process prior to the forming of the split in the rim and is adapted to be divided at the time the rim is divided. After the tubular lugs 60 and 61 have been formed a tubular aligning member 62 is placed in telescoped relation therewith and is preferably secured internally of one of said lugs by a hard solder process to permanently attach it to said lug. The tubular aligning member 62 is provided with a threaded bore which is adapted to receive a threaded connecting member 63. Attention is directed to the fact that the length of the tubular aligning member is such that it provides a long thread bearing for the threaded connecting member 63 and also permits the divided ends of the rim 59 to be spaced sufficiently to allow a lens to be inserted in or removed from the rim without having to separate the telescoping tubular parts. Due to the fact that the parts are constantly held in aligned relation with each other they may be quickly and easily tightened to secure the lens in the rim. The tubular connecting member 62 is provided adjacent its end opposite the threaded connecting member 63 with a disc or wad of soft solder 64 which softens at a very low temperature as compared with the hard solder used to integrally unite the tubular members 60 and 61 with the rim 59 and the tubular member 60 with the tubular aligning member 62. When in proper assembled relation with each other the parts are subjected to heat to cause the solder wad or disc 64 to melt and flow between the threaded connecting member 63 and tube 62. The parts are then allowed to cool so that the solder will harden and permanently anchor the screw against turning in said tube. This prevents the screw from backing out and becoming loose during the use of the mounting. The tube 62 and tubular members 60 and 61 may be formed square in contour so that the divided ends of the rim 49 will be held against twisting sidewise.

The lug 43 used in attaching the nose guard 42 to the guard arm 41 may be formed with flat sides and may be fitted within a flat sided opening 44 in the guard arm 41 to prevent the nose guard 42 from twisting or rotating in said guard arm and yet allow it to tilt to adjust itself to the angle of the nose of the wearer.

It is apparent that although applicant preferably presses the solder wad or disc in each instance into frictional engagement with the inner walls of one of the parts to be connected, the said solder may be placed and held in said part by any suitable means.

From the foregoing description it will be seen that I have provided simple, efficient and inexpensive means of integrally connecting the separable parts of an ophthalmic mounting and improved methods and processes of handling and assembling the parts of the connection with ease and simplicity in combination with means whereby the parts may be quickly united and permanently held during use.

Having described my invention, I claim:

1. The method of forming connecting means for the operable and/or separable parts of an ophthalmic mounting comprising forming a connecting member with a recess and a separate connecting member with a projection which may be fitted in said recess by sliding axial movement, providing each of said connecting members with means which during use will positively associate them with the operable and/or separable parts of the mounting so that when the said connecting members are united the said means will hold the operable and/or separable parts together, and associating heat softenable binding means with one of said connecting members so that the other connecting member may be slidably assembled therewith without having to directly engage or traverse the binding means, the said binding means being so located relative to the assembled parts that when heat is applied thereto the binding means will melt and flow between the parts and when allowed to cool will harden and unite the same.

2. The method of forming connecting means for the operable and/or separable parts of an ophthalmic mounting comprising forming a connecting member with a recess therein and a separate connecting member with a projection which may be fitted into said recess, providing each of said connecting members with means which during use will positively associate them with the operable and/or separable parts of the mounting so that when the said connecting members are united the said means will hold the operable and/or separable parts together and pressing solder means into frictional engagement with the inner walls of the recess so that the said solder means will span the opening of the recess and be frictionally held in fixed relation with said walls, the said solder means being adapted to lie adjacent the end of the projection in said recess when the parts are assembled so that when the parts are subjected to heat the solder will melt and flow between the sides of the projection and the side walls of the recess and when allowed to cool will harden and integrally unite the same.

3. The method of forming connecting means for the operable and/or separable parts of an ophthalmic mounting comprising forming a connecting member with a recess having smooth, unbroken side walls internally thereof and a separate connecting member with a smooth surfaced projection which may be fitted by sliding axial movement into said recess, providing each of said connecting members with means which during use will positively associate them with the operable and/or separable parts of the mounting so that when the said connecting members are united the said means will hold the operable and/or separable parts together, and pressing a wad of solder into frictional engagement with the inner smooth, unbroken walls of the recess so that the said wad will span the opening of the recess and be frictionally held in fixed relation with said unbroken walls, the said wad of solder being adapted to lie adjacent the end of the projection in said recess when the parts are assembled so that when the parts are subjected to heat the solder will melt and flow between the sides of the projection and the side walls of the recess and when allowed to cool will harden and integrally unite the same.

4. The method of forming connecting means for the operable and/or separable parts of an ophthalmic mounting comprising forming a tubular member with smooth, unbroken inner walls and a separate connecting member with a projection which may be fitted by sliding axial movement into said tubular member, providing each of said members with means which during use will positively associate them with the operable and/or separable parts of the mounting so that when the said members are united will hold the said operable and/or separable parts together, and pressing a wad of solder into frictional engagement with the inner unbroken walls of the tube so that the wad will span the openings of the tube and be frictionally held in fixed relation with the inner walls thereof, the said wad of solder being adapted to lie adjacent the end of the projection in said tubular member when the parts are assembled so that when the parts are subjected to heat the solder will melt and flow between the sides of the projection and the inner walls of the tube and when allowed to cool will harden and integrally unite the same.

5. The method of securing together the separable parts of an ophthalmic mounting comprising forming a connecting member separate of said separable parts with a recess and a separate connecting member also separate of said separable parts with a projection which may be fitted in said recess by sliding axial movement, providing each of said connecting members with means which during use will positively associate them with the separable parts of the mounting so that when the said connecting members are united the said means will hold the separable parts together, and associating heat softenable binding means with one of said connecting members before the said members are assembled so that the binding means will be retained in related position with said members and so that the other connecting member may be slidably assembled therewith without entirely traversing the binding means, the said binding means being so located relative to the assembled parts that when heat is applied thereto the binding means will melt and flow between the parts and when allowed to cool will harden and unite the same, placing said connections and parts in assembled relation and heat treating said binding material so as to cause said members to be securely bound together.

6. Connecting means for uniting the separable parts of an ophthalmic mounting comprising a connecting member separate from said parts with a recess, a separate connecting member also separate from said parts with a projection which may be fitted in said recess by sliding axial movement, each of said separate connecting members having means which during use will positively associate them with the said separable parts of the mounting, so that when the said connecting members are united the said means will hold the separable parts together, one of said connecting members having heat softenable binding means associated therewith before the said connecting members are assembled, so that the binding means will be retained in related position with said connecting member and so that the other connecting member may be slidably assembled therewith without entirely traversing the binding means, the said binding means being so located relative to the assembled connecting members that when heat is applied thereto, the binding means will melt and flow between the connecting members and when allowed to cool will harden and unite the said connecting member.

7. Connecting means for uniting parts of an ophthalmic mounting having aligned openings therein comprising in combination a male pin member having a shaft and an enlarged end portion of greater diameter than the shaft of said male pin member and of greater diameter than one of said aligned openings, a female hollow tube member, said female hollow tube member being hollow throughout its length with open ends and having a shaft of smaller diameter than the other of said aligned openings, one of said ends of the female tube member being enlarged and having a greater diameter than the shaft of said female tube member and also of great diameter than the opening in which it is extended, said female tube member having a bore larger than the shaft of the male pin member, the shaft of said male member being of such length that the inserted end is at a distance from the enlarged end of the female member when the said members are placed in position, and binding material of a requisite amount fixed in said female tube member before the said members are assembled and being positioned adjacent to the enlarged end of said female member within the distance between the ends of said members when in assembled relation with each other for the purpose of engaging and binding together said members, the combination of the male pin member, female tube member, and the binding material being such that the shaft portion of the female tube member may be inserted within one of said openings so that the enlarged end of the female tube member engages the part having the said opening therein and being such that the shaft of the male pin member may be inserted within the other of said openings and into the open end of the female hollow tube member, thereby making the enlarged end of the male pin member engage the part having the opening therein in which the pin member is inserted and the said members being adapted to be bound together by said binding material.

8. Connecting means for uniting parts of an ophthalmic mounting having aligned openings therein comprising in combination a female member, said female member having a hollow portion and an open end and having a shoulder portion adjacent its opposite end adapted to engage one of the parts having the openings therein with the hollow portion extending within said opening, a male member having a shoulder portion adjacent one end thereof adapted to engage the other part having an opening therein and having a longitudinal portion adapted to enter the open end of the female member to form a telescopic connection between the two members, the longitudinal portion of said male member being of such length that the inserted end is at a distance from the shoulder portion of the female member when said members are being placed in position, and binding material fixed to said female member to be carried as an integral part thereof and being positioned within the distance between the ends of said members when in telescoped relation with each other for the purpose of binding together said members, the combination of the female member, the male member and the binding material being such that the longitudinal portion of the female member may be inserted into the opening of one of said parts in one direction and such that the longitudinal portion of the male member may be inserted into the opening in the other of said parts in the opposite direction and into the open end of the female member to form a telescopic connection, the longitudinal portions of the two members being adapted to be secured together in the aligned openings by said binding material.

9. Connecting means for uniting parts of an ophthalmic mounting having aligned openings therein comprising in combination a female member having a hollow portion and an open end and having an enlarged end portion, said enlarged end portion being adapted to engage one of said parts having the aligned openings therein with the hollow portion extending within the opening in said part, a male member having an end portion and a longitudinal portion, said end portion being adapted to engage the other of said parts and the said longitudinal portion being adapted to enter the open end of the hollow portion of the female member to form a telescopic connection between the members, and binding material associated with said female member internally of the hollow portion to be carried as an integral part of said female member and for engaging and binding together said members, the longitudinal portion of said male member being of such length that the inserted end is at a distance from the enlarged end of the female member when the said members are being placed in position, and said binding material being positioned on said female member as to lie within the distance between said inserted end of the male member and said enlarged end of the female member, the combination of the female member, the male member and the binding means being such that the hollow portion of the female member may be inserted into one of said aligned openings in one direction and such that the longitudinal portion of the male member may be inserted into the other of said aligned openings in the opposite direction and into the open end of the hollow portion of the female member to form a telescopic connection, and being bound in such connection by the binding means.

10. The process of fastening together parts of an ophthalmic mounting having aligned holes therein for the receiving of a fastening device, comprising the following steps: constructing a female member with an end portion for engaging one of said parts and with a hollow portion extending through both ends of said member, fixing a binding material of a requisite amount in said hollow portion of the female member through an open end thereof so that the said binding means will be carried as a part of said female member, constructing a male member with a longitudinal portion of a size and shape to slidably engage within the hollow portion of the female member and with an end portion for engaging another of said parts, inserting said members into said aligned holes from opposite sides of said parts so as to slidably telescope the members together to position the end of the male member adjacent the binding means and engage the end portions with said parts, and treating said binding material so as to cause said members to be securely bound together.

NELSON M. BAKER.